United States Patent [19]

Hoshi et al.

[11] Patent Number: 4,525,710
[45] Date of Patent: Jun. 25, 1985

[54] PICTURE DISPLAY DEVICE

[75] Inventors: Hideo Hoshi; Hitoshi Kamamori, both of Tokyo, Japan

[73] Assignee: Seiko Instruments & Electronics Ltd., Tokyo, Japan

[21] Appl. No.: 349,384

[22] Filed: Feb. 16, 1982

[51] Int. Cl.³ ............................................. G09G 3/36
[52] U.S. Cl. .................................. 340/784; 340/811; 340/765
[58] Field of Search ............... 340/784, 811, 715, 713, 340/719, 765, 752; 358/230, 231, 232, 236, 165; 315/386

[56] References Cited

U.S. PATENT DOCUMENTS

| | | | |
|---|---|---|---|
| 3,654,606 | 4/1972 | Marlowe | 340/784 X |
| 4,319,237 | 3/1982 | Matsuo | 340/713 |
| 4,393,379 | 7/1983 | Berting | 340/784 |
| 4,393,380 | 7/1983 | Hosokawa | 340/784 X |
| 4,404,555 | 9/1983 | Long | 340/784 |
| 4,413,256 | 10/1983 | Yasuda | 340/784 |
| 4,427,979 | 1/1984 | Clerc | 340/784 X |

*Primary Examiner*—Marshall M. Curtis
*Assistant Examiner*—Vincent P. Kovalick
*Attorney, Agent, or Firm*—Robert E. Burns; Emmanuel J. Lobato; Bruce L. Adams

[57] ABSTRACT

A picture display device has picture elements disposed in a line and row matrix for applying voltage to liquid crystal material to display a picture in accordance with picture signals applied thereto. The picture signals consist of gate signals sequentially applied to the picture elements along the row directions and video signals simultaneously applied to the picture elements along the line directions. A video signal detecting circuit detects the existence of the picture signals and produces a detection signal whenever the picture signals are temporarily absent for longer than a predetermined time period, and circuitry responds to the detection signal for inverting the polarity of the voltage applied to the liquid crystal material. The video signal detecting circuit may detect the presence of a horizontal or vertical synchronous signal of the video signal, or may compare the average voltage level of the video signal with a reference voltage level, to detect the presence of the picture signals. The inversion of the drive voltage polarity greatly prolongs the life of the liquid crystal and since the inversion is carried out during the time that the picture signals are temporarily interrupted, the inversion of the drive voltage polarity does not disturb the picture or cause picture flicker.

12 Claims, 8 Drawing Figures

PICTURE DISPLAY DEVICE

BACKGROUND OF THE INVENTION

The present invention relates to a picture display device and more particularly to a picture display device using a liquid crystal.

FIG. 1 shows a conventional picture display device to display a picture comprising a liquid crystal and a column and row array of picture elements arranged in a matrix configuration. A unit picture element comprises a MOS-FET 1, a storage capacitor 2 and a liquid crystal cell 3. The fundamental operation of the unit picture element will be illustrated. When a negative voltage pulse is applied to a gate line $X_i$ as a gate signal, the MOS-FET 1 of a P channel is turned on and an analogue video signal applied to a signal line $Y_i$ charges the storage capacitor 2 through the FET 1. The FET 1 is turned off if the negative voltage pulse is removed. Since the lead currents of the FET 1 and the liquid crystal cell 3 are quite small, a voltage in proportion to the video signal charged in the capacitor 2 is maintained applied to the liquid crystal cell 3 for a considerably long time. The gate signals are sequentially scanned on the row electrode lines $X_i$, $X_{i+1}$, $X_{i+2}$ . . . , and the video signals corresponding to the lines are simultaneously applied to the column electrode lines $Y_i$, $Y_{i+1}$, $Y_{i+2}$, . . . , whereby the overall picture is diplayed.

FIG. 2 shows a sectional view of a picture element including the FET 1. In the P-channel MOS-FET, reference numeral 4 denotes an n type $S_i$ substrate, 5 and 6 denote respectively a source and a drain in a P+ diffusion region, and the source 5 is connected in the $Y_i$ direction in FIG. 1. Reference numeral 7 denotes a gate oxide, and 8 denotes a gate electrode connected in the $X_i$ direction. Reference numeral 9 denotes a picture electrode of a liquid crystal cell and the electrode 9 also forms of a capacitor together with a thin oxide 11 and the substrate 4. Reference numeral 12 denotes a liquid crystal, and 13 denotes a transparent counter electrode which serves as a common electrode for the overall picture area. Reference numeral 14 denotes a surface glass substrate and 10 denotes an insulation film. In this structure the voltage polarity applied to the liquid crystal is unidirectional and it is directly driven. Therefore the liquid crystal is of short life and of low reliability.

A method of inverting the video signals in synchronism with the signals applid to the common electrode at a given period of time has been considered to drive the liquid crystal alternately. If the video signal is inverted at a period of around 30 Hz, half of the picture is displayed negatively. Although the signal has been inverted at a period of 1 Hz, and 10 Hz or more to avoid the negative display, such is not practicable as the picture flickers with each inversion.

Accordingly, it is an object of the present invention to provide a picture display device of longer life and of greater reliability without disturbing or flickering the picture.

DETAILED DESCRIPTION OF INVENTION

Figure 1:
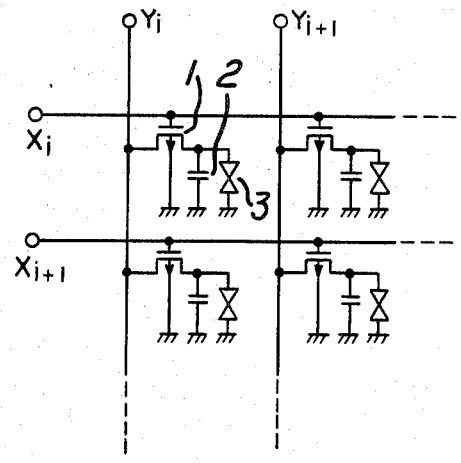
FIG. 1 shows an equivalent circuit diagram of a picture display device using a conventional liquid crystal.
Figure 2:
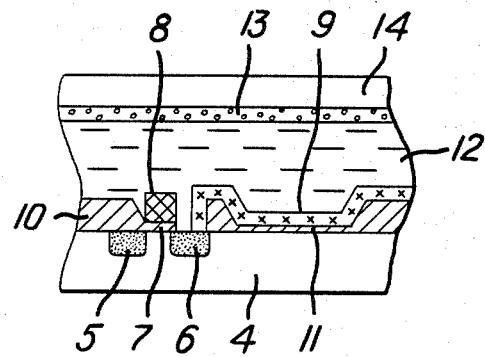
FIG. 2 shows a sectional view of a conventional picture element.
Figure 3:
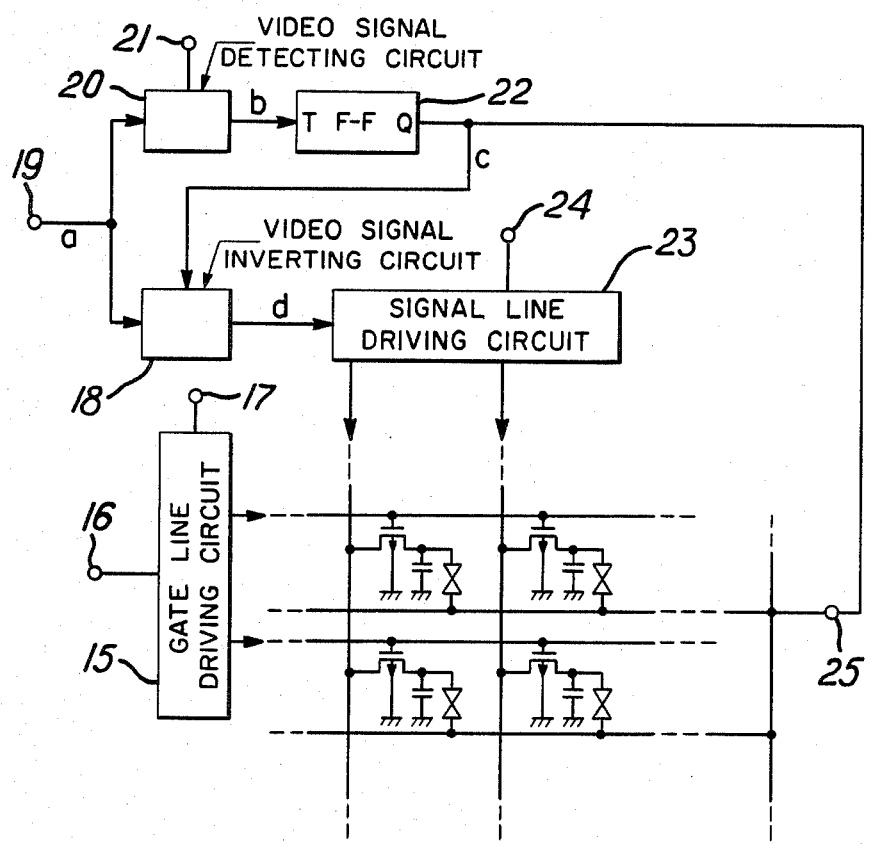
FIG. 3 shows a block diagram of a panel of a picture display device and its driving circuits according to the present invention.
Figure 4:
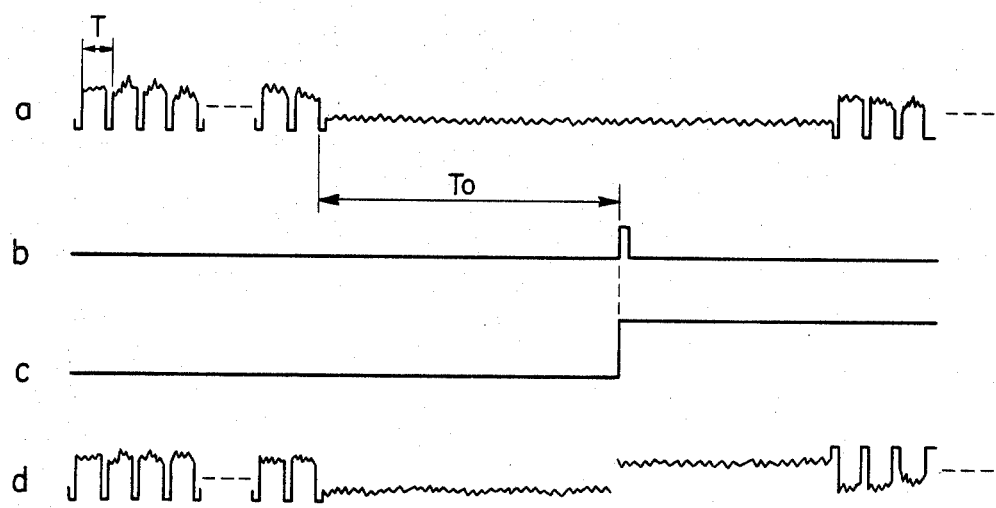
FIG. 4 shows a waveform chart of the signals produced by the circuits in FIG. 3.

FIG. 3 shows a picture display device according to the present invention. Reference numeral 15 denotes a gate line driving circuit comprising a shift register, 16 denotes a clock signal input terminal, 17 denotes a serial input terminal, 18 denotes a video signal inverting circuit, 19 denotes a video signal input terminal, 20 denotes a video signal detecting circuit, 21 denotes a clock input terminal, 22 denotes a fliplop circuit (referred to as FF hereafter), 23 denotes a signal line driving circuit to apply video signals to a signal line Y after sampling, 24 denotes a clock signal input terminal and 25 denotes a common electrode terminal. FIG. 4 shows the waveforms of each circuit portion.

The circuit operation will now be described in conjunction with FIGS. 3 and 4.

Initially a video signal "a" of positive polarity is applied to the terminal 19. When a control signal "c" applied to the inverting circuit 18 is "0", the video signal a is applied to the driving circuit 23 as a video signal "d". When a video signal a is not applied to the terminal 19 for some reason in a certain instant, a detection pulse "b" is produced by the detecting circuit 20 to invert the FF 22. Then the control signal "c" applied to the inverting circuit 18 is inverted and the output video signal "d" from the same becomes a video signal d of negative polarity. Simultaneously the voltage polarity of the common electrode 25 is inverted. Consequently the voltage polarity applied to the liquid crystal is inverted. In this manner, the polarity is inverted whenever the video signals are interrupted, and the life of the liquid crystal is greatly prolonged. Moreover, since the inverting operation is carried out when the video signals are temporarily interrupted, the flickering of the picture caused by the inversion is negligible. Because the polarity can be inverted by an instantaneous interruption of the video signals, the inverting operation may be carried out even if the picture is scarcely disturbed. Therefore, it is desired that the inverting operation is carried out when the video signals are interrupted for a given predetermined period of time $T_Q$, e.g. more than a period of 1 field (about 16 msec).

Figure 5:
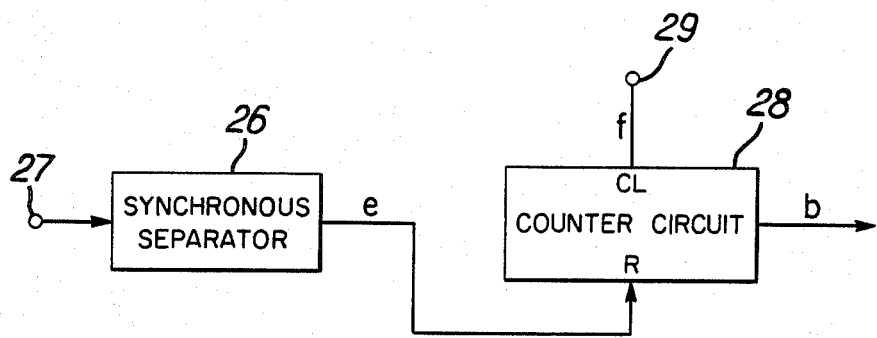
FIG. 5 shows a block diagram of an embodiment of a video signal detecting circuit.
Figure 6:
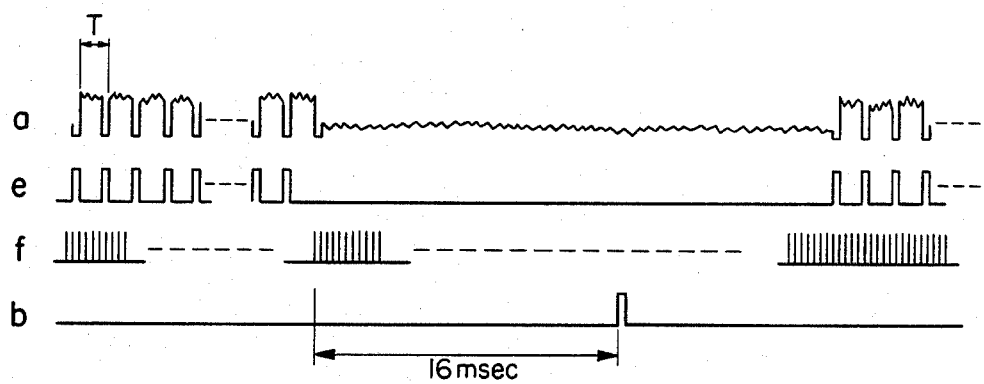
FIG. 6 shows a waveform chart of the signals produced by the circuits in FIG. 5.

FIG. 5 shows an embodiment of the video signal detecting circuit 20. When a video signal is fed to an input terminal 27 of a synchronous separator 26, a synchronous signal indicated by "e" in FIG. 6 is produced. The period T denotes the time corresponding to one scanning line. The synchronous signal "e" is fed to a counter circuit 28 as a reset signal. The counter circuit 28 counts the number of pulses "f" from a clock input terminal 29, and if the reset signal is not fed for more than 16 msec, the detection pulse "b" is produced from the counter circuit 28. While the embodiment of FIG. 6 shows that the existence of the video signal is detected by detecting a horizontal synchronous signal, it is to be noted that the existence of the video signal can be also detected by detecting a vertical synchronous signal.

Figure 7:
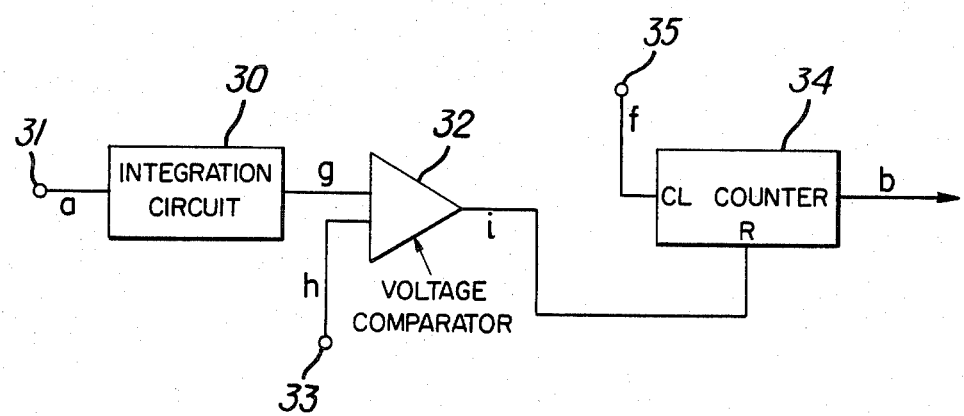
FIG. 7 shows a block diagram of another embodiment of the video signal detecting circuit.
Figure 8:
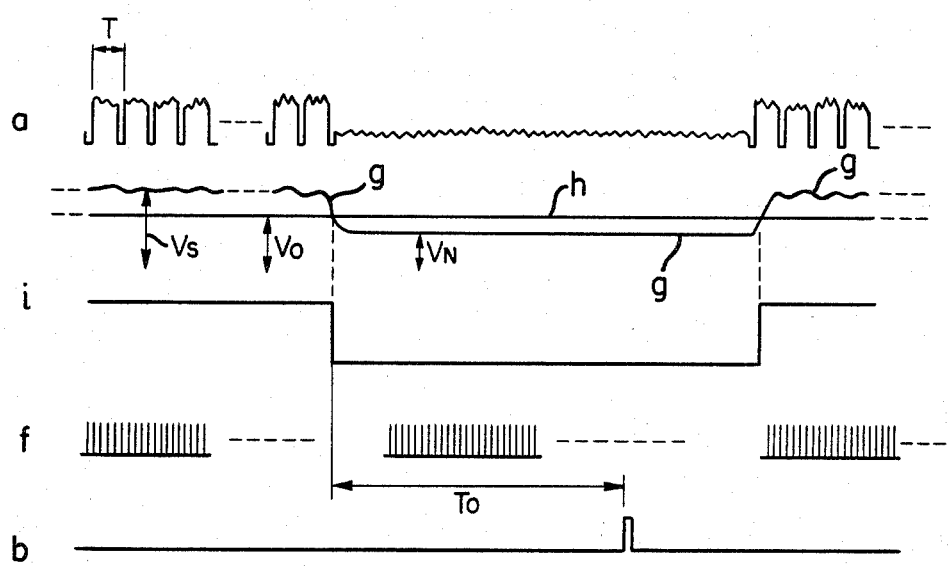
FIG. 8 shows a waveform chart of the signals produced by the circuits in FIG. 7.

FIG. 7 shows another embodiment of the video signal detecting circuit 20. When a video signal is fed to an input terminal 31 of an integration circuit 30, an output signal "g" becomes an average voltage level of the video signal, and the voltage $V_S$ is produced when the video signal is normally being applied and the voltage $V_N$ is produced when the video signal is temporarily interrupted. An output from the integration circuit 30 is applied to a comparator 32 which also receives a reference voltage $V_O$ having a value between the voltage $V_S$ and the voltage $V_N$ via an input terminal 33. The output from the comparator 32 is at a "1" level when the video signal is normally being applied and at a "0" level when it is temporarily interrupted, as shown by a waveform "i". The output signal "i" functions as a reset signal of a counter 34. By applying a clock signal "f" from an input terminal 35, the output detection pulse "b" is produced when the video signal is interrupted for a time interval at least as long as the given period $T_0$.

While the inverting operation is carried out when the video signal is interrupted for a period of 1 field in this embodiment, it is to be noted that the same effect may be obtained by carrying out the inverting operation when the video signal is interrupted for a period of 1 frame (about 32 msec), 1 second or the like.

The above noted driving method may be applied to a twisted nematic mode (TN-type) liquid crystal display device, a dynamic scattering mode (DSM) liquid crystal display device or the like. The inverting period is considered to be comparatively long since it is carried out when the channel is switched or when the video signal is interrupted by the disorder of the received electric wave. Therefore the driving method is most effective in the case of a guest-host type liquid crystal and can prolong its life by using an inversion of a comparatively long period. Namely, it has been confirmed that the life of the liquid crystal, which is 5000 hours using the direct-current drive, can be increased to more than 30,000 hours, i.e. more than 6 times as long as before, using the inverted drive of the present invention.

As illustrated so far, the picture display device according to the present invention carries out the inverting operation when the video signal is temporarily interrupted for a given period of time by channel switching or the disorder of the received electric wave. Accordingly the disturbing or flickering of the picture accompanied by the inverting operation is not visually noticeable and the flickering of the picture caused by the inverting operation is substantially removed. Moreover, it has been confirmed by experimentation that the life of the guest-host liquid crystal is prolonged by a change in the polarity, even though done at irregular times, applied to the liquid crystal, and at the same time high reliability is achieved. Consequently, the primary object of the invention to provide a liquid crystal display of longer life and dependability without disordering or flickering of the picture is completely attained, and thereby the industrial value of the present invention is substantial.

We claim:

1. In a picture display device having field effect transistors deposited on a semiconductor layer formed on an insulating substrate in a column and row configuration; a first electrode which is one electrode of said field effect transistor; a second electrode which is a transparent electrode deposited on a transparent substrate opposite to said first electrode; and a liquid crystal held between the first electrode and the second electrode and to which a voltage is applied by the first and second electrodes, the improvement comprising: detecting means for detecting the existence of picture signals and producing a detection signal if the picture signals are temporarily interrupted for more than a given period of time; and means for inverting the voltage polarity applied to the liquid crystal held between the first electrode and the second electrode in response to the detection signal.

2. A picture display device as claimed in claim 1, wherein the detecting means comprises means for detecting the existence of a horizontal synchronous signal or a vertical synchronous signal of a video signal to detect the existence of the picture signals.

3. A picture display device as claimed in claim 1, wherein the detecting means comprises means for comparing an average voltage level of the video signal with a reference voltage level to detect the existence of the picture signals.

4. In a picture display device comprised of picture elements disposed in a column and row matrix for applying voltage to liquid crystal material to display a picture in accordance with picture signals applied thereto from corresponding column and row electrodes: detecting means for detecting the presence of the picture signals and producing a detection signal whenever the picture signals are temporarily interrupted for longer than a predetermined time period; and means responsive to the detection signal for inverting the polarity of the voltage applied to the liquid crystal material.

5. A picture display device according to claim 4; wherein the picture signals are composed of gate and video signals; and the detecting means comprises means for detecting the presence of a horizontal synchronous signal or a vertical synchronous signal of the video signal to thereby detect the presence of the picture signals.

6. A picture display device according to claim 4; wherein the picture signals are composed of gate and video signals; and the detecting means comprises means for comparing the average voltage level of the video signal with a reference voltage level to thereby detect the presence of the picture signals.

7. A picture display device according to claim 4; wherein the predetermined time period corresponding to the duration of 1 field.

8. A picture display device according to claim 4; wherein the predetermined time period corresponding to the duration of 1 frame.

9. A picture display device according to claim 4; including first and second electrodes disposed on opposite sides of the liquid crystal material for applying voltage thereto, the first electrode comprising a picture electrode of the picture elements.

10. A picture display device according to claim 4; including first and second electrodes disposed on opposite sides of the liquid crystal material for applying voltage thereto; and wherein the picture elements comprise a field effect transistor one electrode of which comprises the first electrode, and an electrode which is common to all the picture elements and which comprises the second electrode.

11. A picture display device according to claim 10; wherein the picture signals are composed of gate and video signals; and the detecting means comprises means for detecting the presence of a horizontal synchronous signal or a vertical synchronous signal of the video signal to thereby detect the presence of the picture signals.

12. A picture display device according to claim 10; wherein the picture signals are composed of gate and video signals; and the detecting means comprises means for comparing the average voltage level of the video signal with a reference voltage level to thereby detect the presence of the picture signals.

* * * * *